(No Model.)
J. G. POHLÉ.
COMPRESSED AIR WATER ELEVATOR.
No. 347,196. Patented Aug. 10, 1886.
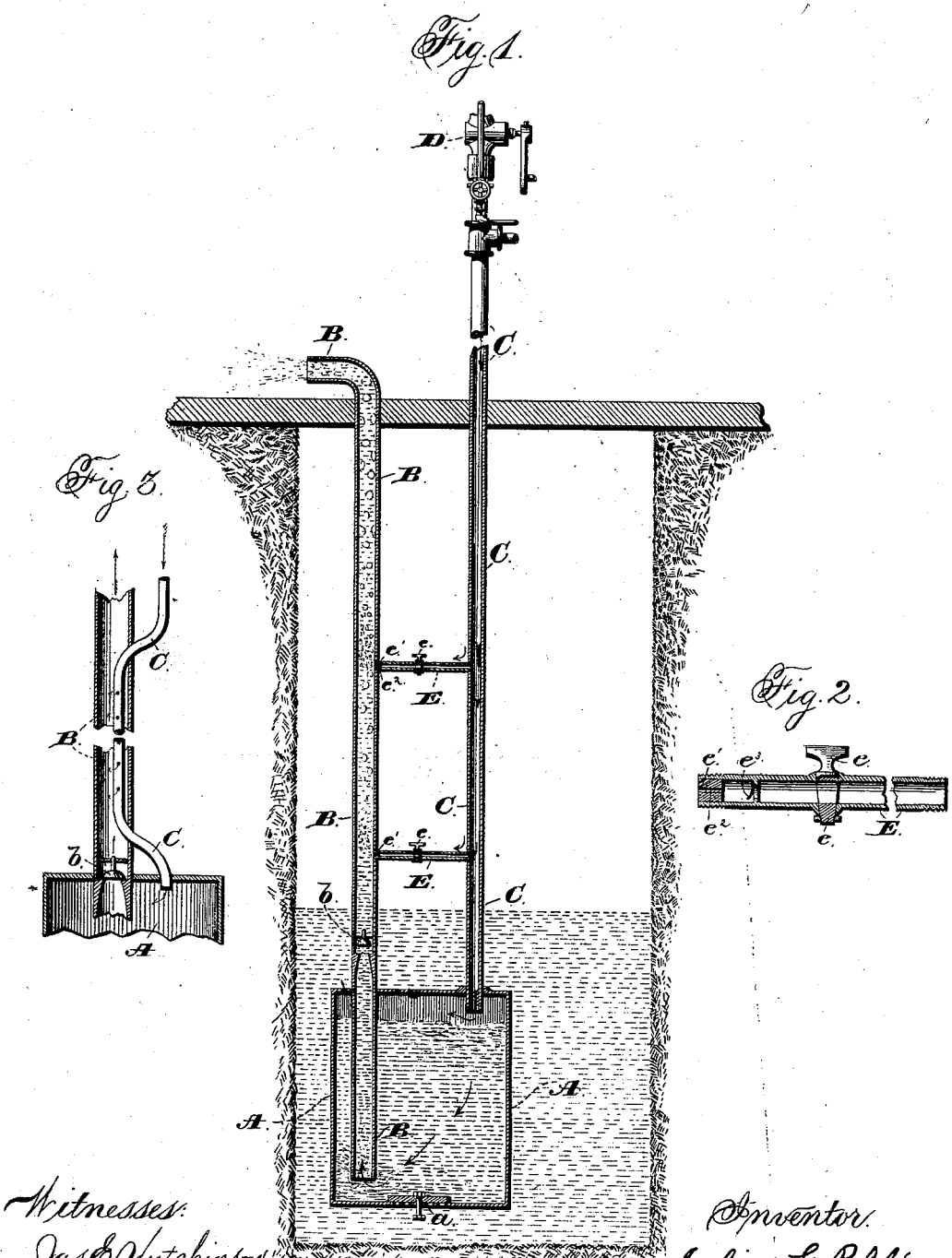

UNITED STATES PATENT OFFICE.

JULIUS G. POHLÉ, OF GEORGETOWN, COLORADO.

COMPRESSED-AIR WATER-ELEVATOR.

SPECIFICATION forming part of Letters Patent No. 347,196, dated August 10, 1886.

Application filed January 23, 1886. Serial No. 189,484. (No model.)

*To all whom it may concern:*

Be it known that I, JULIUS G. POHLÉ, of Georgetown, in the county of Clear Creek, and in the State of Colorado, have invented certain new and useful Improvements in Compressed-Air Water-Elevators; and I do hereby declare that the following is a full, clear, and exact description thereof, reference being had to the accompanying drawings, in which—

Figure 1 shows a vertical sectional view of my apparatus; Fig. 2, a detail view, partly in section, of one of the connecting-pipes between the compressed-air pipe and the water-discharge pipe; and Fig. 3, a detail sectional view of a modification of the apparatus shown in Fig. 1.

Letters of like name and kind refer to like parts in each of the figures.

The object of my invention is to provide an improved water-elevating apparatus by which the water can be elevated to a greater distance than heretofore possible with a given amount of power or pressure; and to this end my invention consists of the apparatus and the construction, arrangement, and combination of parts thereof, as hereinafter specified.

In the drawings, A designates the receiving or collecting tank or chamber of a compressed-air water-elevator. As is usual in such elevators, the tank has the upwardly or inwardly opening valve $a$, preferably at its bottom, and the discharge-pipe B, extending up from near the bottom of the tank, has the check-valve $b$, also opening upward. Entering the top of the tank or chamber A is the compressed-air pipe C, to be connected at its upper end with suitable air-compressing or compressed-air-supplying devices. The source of supply of compressed air or the manner or means of compressing and supplying it to the pipe C can be of any desired kind and can be varied as desired without departure from my invention.

For regulating the necessary intermittent flow of the compressed air down through the pipe to the tank, I prefer the valve mechanism shown and described in the joint application of myself and David Hill, No. 156,386, now pending. At D, I show the three-way cock used with such mechanism. I do not limit myself, however, to such cock or to any valve mechanism or means for properly intermitting the flow of air into the chamber or tank A or allowing it to flow alternately into and out of the same. The discharge-pipe B, as usual, is to extend up to the point at which the water is to be discharged and run off. Between the air inlet or supply pipe C, and the pipe B, I place one or more connecting-pipes, E, preferably screw-threaded, as shown, at both ends, and screwed into suitable threaded openings in the pipes. I contemplate providing each connecting-pipe with a stop-cock, $e$; but such is not at all necessary and can be dispensed with as desired. The opening of each pipe E into the water-discharge pipe is preferably made quite small. In the drawings I show a plug, $e'$, in the pipe, in which is a small opening, $e^2$, connecting with the bore of the discharge-pipe. Instead of one opening $e^2$, there may be several in each plug, all made small, so that the air flowing through them from the air-pipe into the water contained in the discharge-pipe will be in small jets, so as to form numerous small bubbles, as indicated in the drawings. I contemplate, if desired, putting in each connection-pipe E used a check-valve, $e^3$, as indicated in Fig. 2, adapted to open to pressure from the air-pipe side, but to close against pressure from the other way. Such valve can be of any of the well-known and common forms. It is not necessary, and may ordinarily be dispensed with without detriment so the action of the apparatus.

In using my apparatus or elevating mechanism, as shown and described, the operation is as follows: The tank or chamber A being immersed in the water to be elevated, the surrounding water rushes up past valve $a$ and fills the tank. Compressed air being then by suitable valve mechanism admitted to pipe C, passes downward through it into the tank in the usual way and forces the water therein up the discharge-pipe. So much of the action of the apparatus is common in other water-elevators; but it has been found that to raise water in this way it has heretofore required, at sea-level, about fifteen pounds pressure for every thirty-three feet that the water is caused to rise in the water-discharge pipe. In my apparatus, as shown and described, some of the compressed air from pipe C passes through each connecting-pipe, which I call a "blow-tube," and enters the column of water in pipe B through the small opening or openings, so as to form numerous bubbles therein. The air so injected into the discharge water-column has, I have found, a remarkably advantageous effect upon the workings of the apparatus. Where the water was forced to a height of sixty-five feet without injecting air, as described, into the discharge water-pipe, it was found that the pressure of the compressed air had to be thirty-five pounds. After the introduction of one of the connecting blow-tubes at a point about forty feet from the top of the discharge-pipe and twenty-five feet from its bottom it was found that no longer was thirty-five pounds pressure needed, but only fifteen—that is, the water was raised the same height as before by air at less than half the pressure before necessary. While the water issuing from the eduction-pipe under the new conditions was not entirely continuous in its stream, it was more so than before. Though the water discharged was mixed somewhat with air, the amount of water expelled in the steadier stream per minute was about the same as before, and at times appeared to be even greater. It is intended to have a number of the blow-tubes, one for about every twenty-five or thirty feet of the height of the discharge-pipe when only fifteen pounds pressure is used, or one for every fifty or sixty feet when compressed air of thirty pounds pressure is used. The lowest blow-tube should be above the check-valve in the discharge-pipe. If desired, a separate air-supply pipe, besides the main pipe C, can be used to conduct and supply air to the blow-tubes, to be injected into the column of discharge water, and gases or vapors compressed or under pressure can be used with my apparatus, instead of the compressed air, without departure from my invention.

In Fig. 3 I show a modified form of the apparatus shown in Fig. 1. In this form the air-supply pipe C, instead of being carried down parallel with the eduction-pipe B, and connected therewith by the connecting-pipes E E, is conducted into and extends down within the pipe B to a point near the collecting tank or cistern A. It is then carried outside of the pipe B and connected with the tank or cistern, as in the other form of apparatus shown and described. The portion of the air-pipe which is within pipe B is provided with any desired number of small openings through which the air can escape or be injected into the column of water, for the purpose set forth hereinbefore, to act on the water in the same way as the injected air in the form of apparatus shown in Fig. 1.

I contemplate aiding the action of all kinds of pumps or forcing devices for elevating water or other liquids by air injected into the discharge or eduction pipe, as set forth and shown herein.

My apparatus, as described and shown, is obviously useful for elevating other liquids—as, for instance, oil—as well as water.

I do not claim or desire to cover by my claims an injector or ejector used as a drawing and forcing device, and operated by steam, water, or air, or a series of water-forcing devices placed at intervals along a pipe and adapted to act on the water in succession as it passes along up the pipe. The air admitted, as described and shown by me, into the eduction-pipe above the forcing device proper is not intended to and does not have any such action as the steam, water, or other medium used in ejectors. It simply flows into the column of water in the pipe in fine streams and mixes with it. There is not needed, therefore, the great pressure and power necessary where an ejector is used, but only enough to overcome the pressure of the water against the air-openings.

Where my apparatus, as described and shown, is used instead of a series of forcing devices or ejectors, there is a positive and considerable saving in the power and pressure necessary to be maintained.

Having thus described my invention, what I claim is—

1. In combination with means for positively forcing or elevating water and the rising eduction pipe or passage thereof, means for injecting air directly into such rising pipe to mingle with the ascending column of water, substantially as and for the purpose specified.

2. In combination with power mechanism for positively forcing water up a rising eduction pipe or passage, means for introducing air into the eduction-pipe to mingle with the ascending column of water, substantially as and for the purpose shown.

3. In combination with a device for positively elevating water by compressed air, having the compressed-air inlet or supply pipe and the rising eduction-pipe, means for introducing air into the eduction-pipe from the air-supply pipe, substantially as and for the purpose set forth.

4. In combination with the rising eduction pipe or passage of a liquid-elevating device provided with a check-valve to prevent the downward flow of liquid in the eduction-pipe, means for introducing air into the eduction-pipe above the valve, substantially as and for the purpose described.

5. In combination with a device for elevating water by compressed air having the compressed-air inlet or supply pipe and the rising eduction-pipe, one or more connecting-pipes, between such inlet and eduction pipes adapted to inject air into the eduction-pipe in a fine jet or jets, substantially as and for the purpose specified.

6. In combination with the collecting tank or chamber and the compressed-air and upright eduction pipes, one or more tubes or pipes connecting the air and eduction pipes above the tank or chamber, substantially as and for the purpose described.

7. In combination with the upright water-eduction pipe B and the compressed-air pipe C, one or more tubes connecting such pipes, each provided with a plug having one or more small orifices connecting with the bore of the water-eduction pipe, substantially as and for the purpose described.

8. The improved method of raising water or other liquids, which consists in forcing the same up an upright eduction-pipe and introducing air into the column of water in the pipe to mingle with the ascending column of water, substantially as and for the purpose described.

9. The improved method of elevating water or other liquids, which consists in forcing the water or liquid up in an upright eduction-pipe by a suitable forcing or pumping device and injecting into the column of liquid within the pipe air in the form of a fine jet or jets, so as to form bubbles in the liquid, substantially as and for the purpose described.

In testimony that I claim the foregoing I have hereunto set my hand this 9th day of December, A. D. 1885.

JULIUS G. POHLÉ.

Witnesses:
J. P. POST,
ROBERT H. COE.